United States Patent
Rose

(10) Patent No.: US 12,049,333 B2
(45) Date of Patent: Jul. 30, 2024

(54) UNMANNED AERIAL VEHICLE

(71) Applicants: Sony Corporation, Tokyo (JP); Sony Europe B.V., Weybridge (GB)

(72) Inventor: Nicolas Pierre Rose, Eastleigh (GB)

(73) Assignees: Sony Corporation, Tokyo (JP); Sony Europe B.V., Weybridge (GB)

( * ) Notice: Subject to any disclaimer, the term of this patent is extended or adjusted under 35 U.S.C. 154(b) by 913 days.

(21) Appl. No.: 16/981,752

(22) PCT Filed: Mar. 21, 2019

(86) PCT No.: PCT/GB2019/050797
§ 371 (c)(1),
(2) Date: Sep. 17, 2020

(87) PCT Pub. No.: WO2019/186118
PCT Pub. Date: Oct. 3, 2019

(65) Prior Publication Data
US 2021/0031915 A1    Feb. 4, 2021

(30) Foreign Application Priority Data
Mar. 28, 2018 (GB) .................................... 1805011

(51) Int. Cl.
*B64U 50/39*      (2023.01)
*B60L 50/64*      (2019.01)
(Continued)

(52) U.S. Cl.
CPC .............. *B64U 50/39* (2023.01); *B60L 50/64* (2019.02); *B60L 53/00* (2019.02); *B60L 53/305* (2019.02);
(Continued)

(58) Field of Classification Search
CPC ........ B64U 50/39; B64U 50/19; B64U 50/34; B60L 50/64; B60L 53/00; B60L 53/305;
(Continued)

(56) References Cited

U.S. PATENT DOCUMENTS 6,936,376 B2 *   8/2005   Plumadore .......... H01M 50/209
                                                                429/96
9,139,310 B1 *   9/2015   Wang ...................... B64F 1/007
(Continued)

FOREIGN PATENT DOCUMENTS

CN        204415738 U       6/2015
CN        104760705 A       7/2015
(Continued)

OTHER PUBLICATIONS

International Search Report issued Jul. 8, 2019 in PCT/GB2019/050797 filed Mar. 21, 2019.
(Continued)

*Primary Examiner* — M Baye Diao
(74) *Attorney, Agent, or Firm* — Oblon, McClelland, Maier & Neustadt, L.L.P.

(57) ABSTRACT

An unmanned aerial vehicle (UAV) comprising a battery holding portion configured to releasably hold a first battery to provide electrical power to the UAV, the battery holding portion being configured to hold the first battery in a position relative to a direction of travel of the UAV such that, upon the UAV encountering a second battery positioned in the path of travel of the UAV, the first battery receives a mechanical impulse from the second battery causing the first battery to be released from the battery holding portion and the second battery replaces the first battery to become held by the battery holding portion to provide electrical power to the UAV.

17 Claims, 9 Drawing Sheets

(51) Int. Cl.
*B60L 53/00* (2019.01)
*B60L 53/30* (2019.01)
*B60L 53/80* (2019.01)
*B60L 58/10* (2019.01)

(52) U.S. Cl.
CPC .............. *B60L 53/80* (2019.02); *B60L 58/10* (2019.02); *B60L 2200/10* (2013.01)

(58) Field of Classification Search
CPC ...... B60L 53/80; B60L 58/10; B60L 2200/10; B60L 50/50; Y02T 10/70; Y02T 10/7072; Y02T 50/40; Y02T 50/60; Y02T 90/12; Y02T 90/14; Y02T 90/16; B64D 27/24; B64C 39/024; B64C 39/02
USPC ......................................................... 320/109
See application file for complete search history.

(56) References Cited

U.S. PATENT DOCUMENTS

| | | | |
|---|---|---|---|
| 9,527,605 B1 | 12/2016 | Gentry et al. | |
| 9,551,989 B2* | 1/2017 | Scarlatti | B64U 50/39 |
| 9,567,081 B1 | 2/2017 | Beckman et al. | |
| 9,896,182 B1 | 2/2018 | Beckman et al. | |
| 10,442,312 B2* | 10/2019 | Liang | B64C 39/024 |
| 10,836,484 B2* | 11/2020 | Volpi | B25J 11/00 |
| 11,318,859 B2* | 5/2022 | Henry | B64U 70/99 |
| 2014/0032034 A1 | 1/2014 | Raptopoulos et al. | |
| 2014/0250653 A1 | 9/2014 | Droste | |
| 2016/0039300 A1* | 2/2016 | Wang | B64U 50/39 |
| | | | 244/58 |
| 2016/0163204 A1 | 6/2016 | Raptopoulos et al. | |
| 2017/0096075 A1* | 4/2017 | Henry | B60L 53/80 |
| 2017/0120763 A1 | 5/2017 | Henry et al. | |
| 2017/0316701 A1 | 11/2017 | Gil | |
| 2018/0093768 A1 | 4/2018 | Castleman et al. | |
| 2018/0105063 A1* | 4/2018 | Wei | B60L 50/66 |
| 2018/0222339 A1 | 8/2018 | Henry et al. | |
| 2018/0253981 A1 | 9/2018 | Raptopoulos et al. | |

FOREIGN PATENT DOCUMENTS

| | | | | |
|---|---|---|---|---|
| CN | 105059550 A | | 11/2015 | |
| CN | 205564859 U | | 9/2016 | |
| CN | 106068592 A | | 11/2016 | |
| CN | 106483979 A | | 3/2017 | |
| CN | 206179949 U | | 5/2017 | |
| EP | 3307585 B1 | * | 12/2019 | .............. B60K 1/04 |
| JP | 2014031118 A | | 2/2014 | |
| JP | 5874940 B1 | | 3/2016 | |
| KR | 10-1705838 B1 | | 2/2017 | |
| KR | 10-1791627 B1 | | 10/2017 | |
| KR | 101805440 B1 | | 12/2017 | |
| KR | 102040047 B1 | * | 11/2019 | .............. B60L 53/80 |
| WO | WO 2011/010651 A1 | | 1/2011 | |
| WO | WO-2015072548 A1 | | 5/2015 | |
| WO | WO 2018/142925 A1 | | 8/2018 | |

OTHER PUBLICATIONS

Great Britain Search Report issued Sep. 19, 2018 in Great Britain Application No. GB1805011.2 filed Mar. 28, 2018, citing documents AJ and AT therein, 1 page.

* cited by examiner

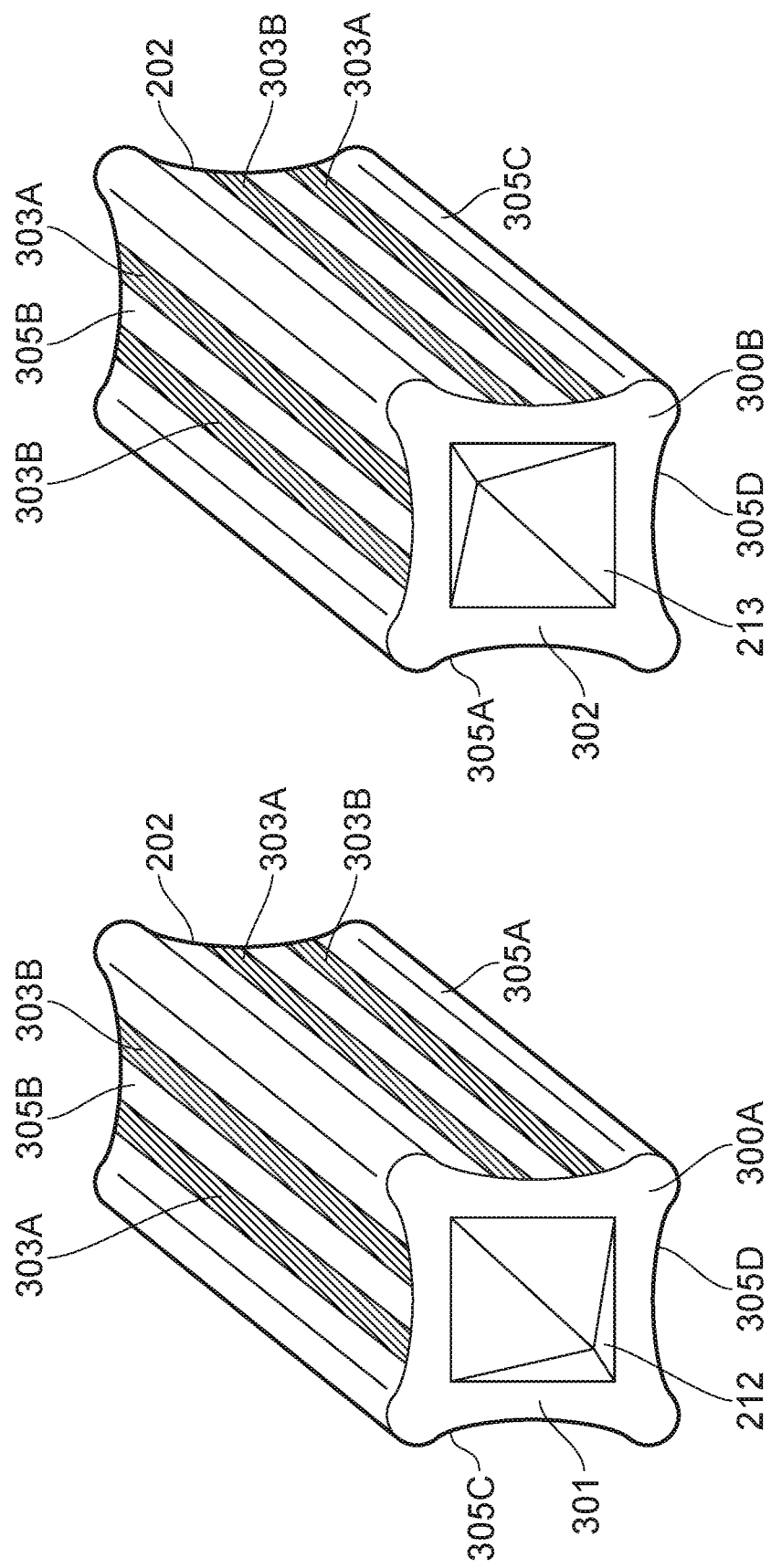

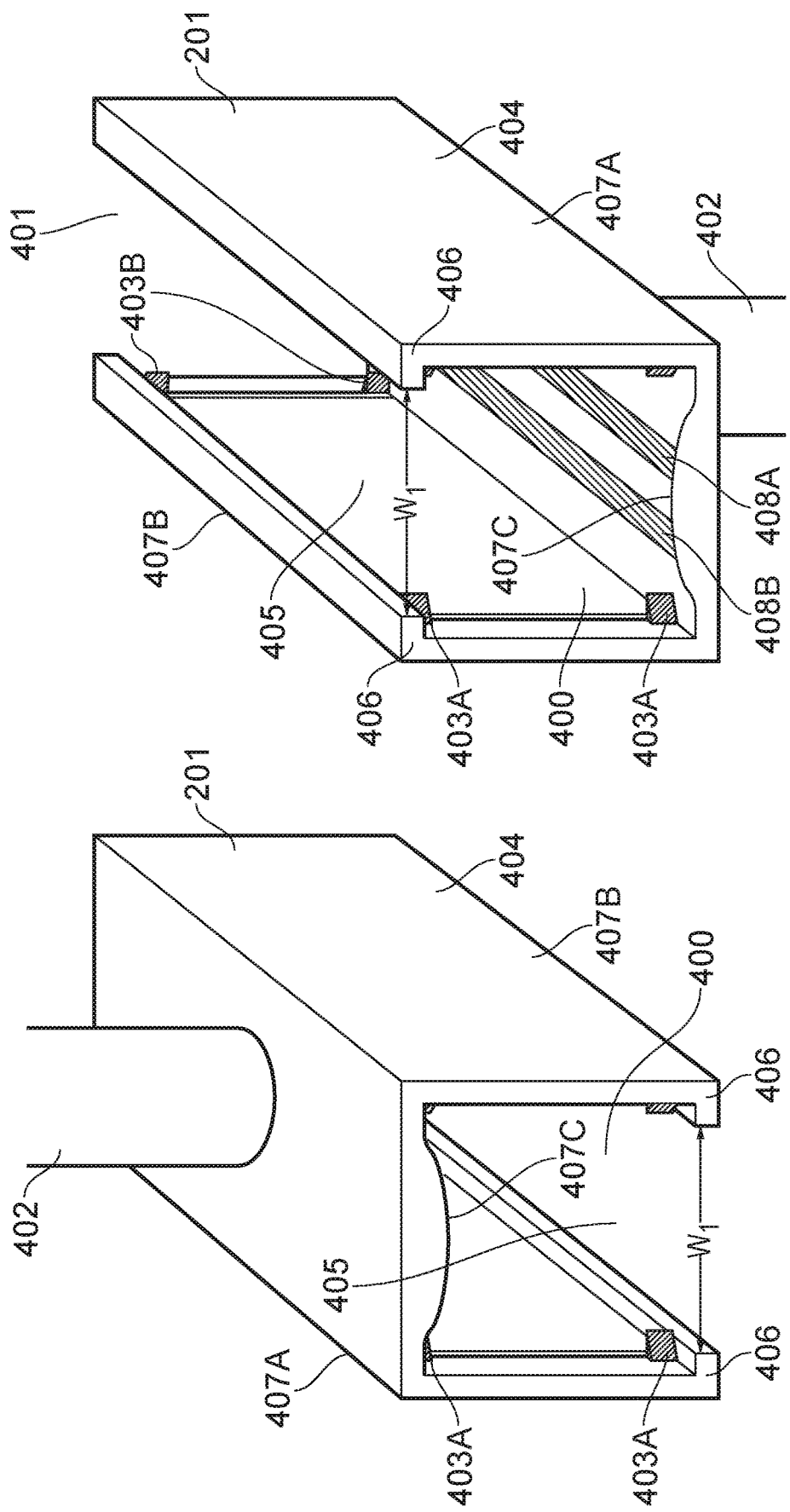

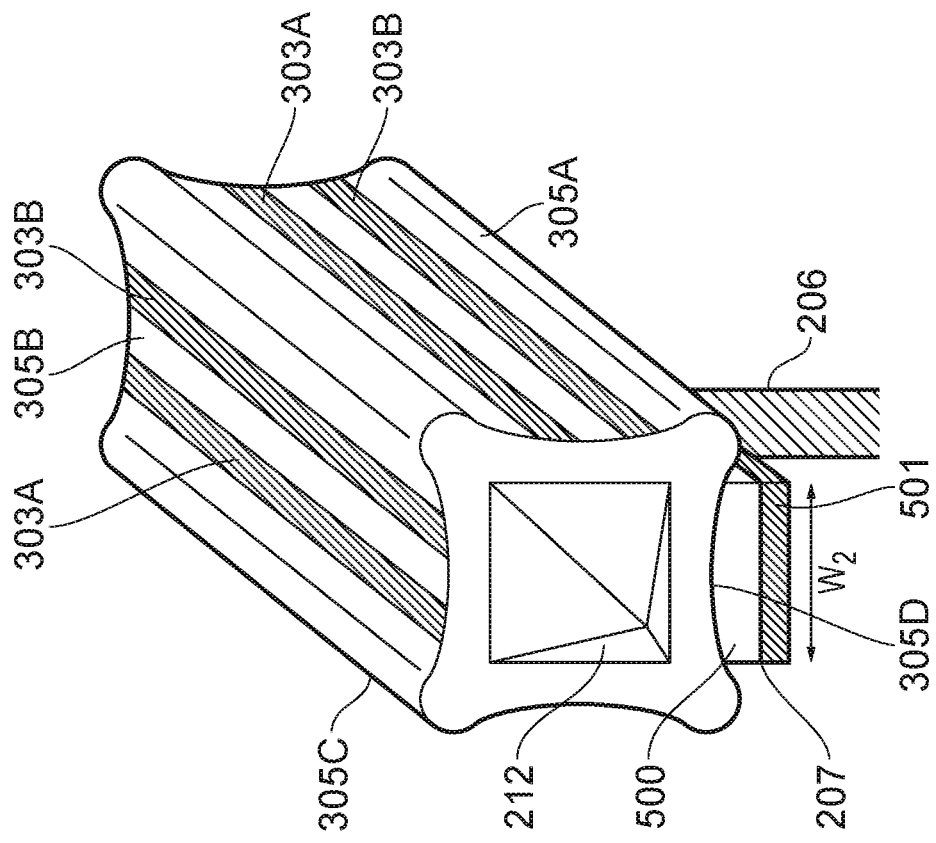
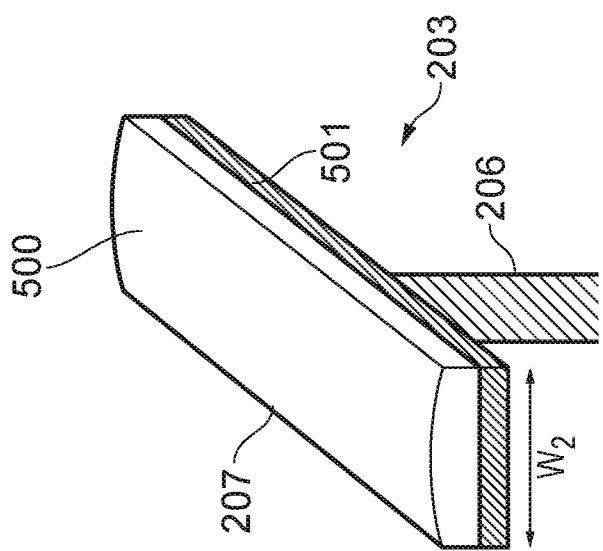
FIG. 5B
FIG. 5A

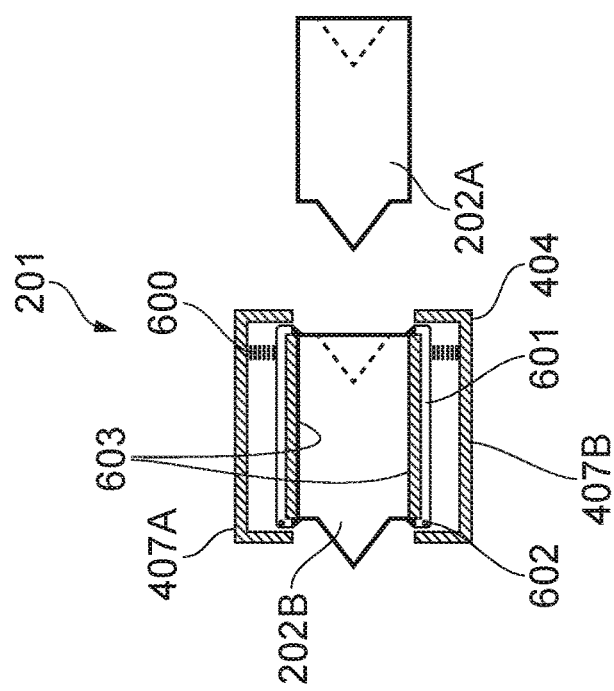
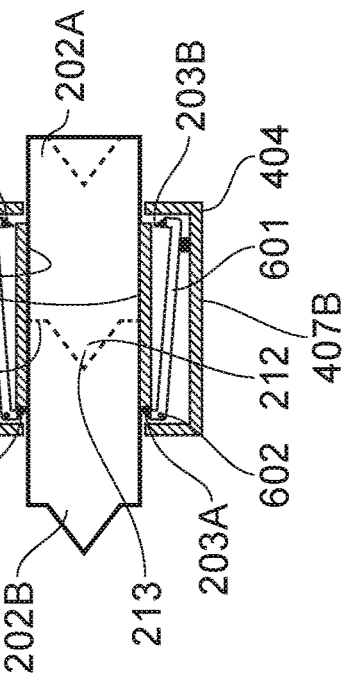
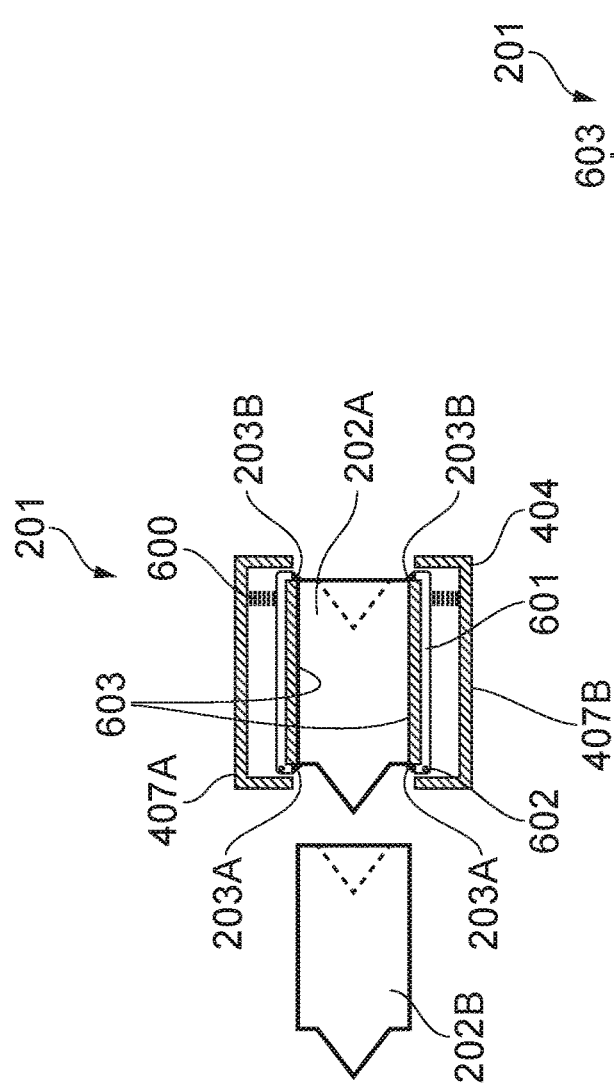
FIG. 6A
FIG. 6B
FIG. 6C

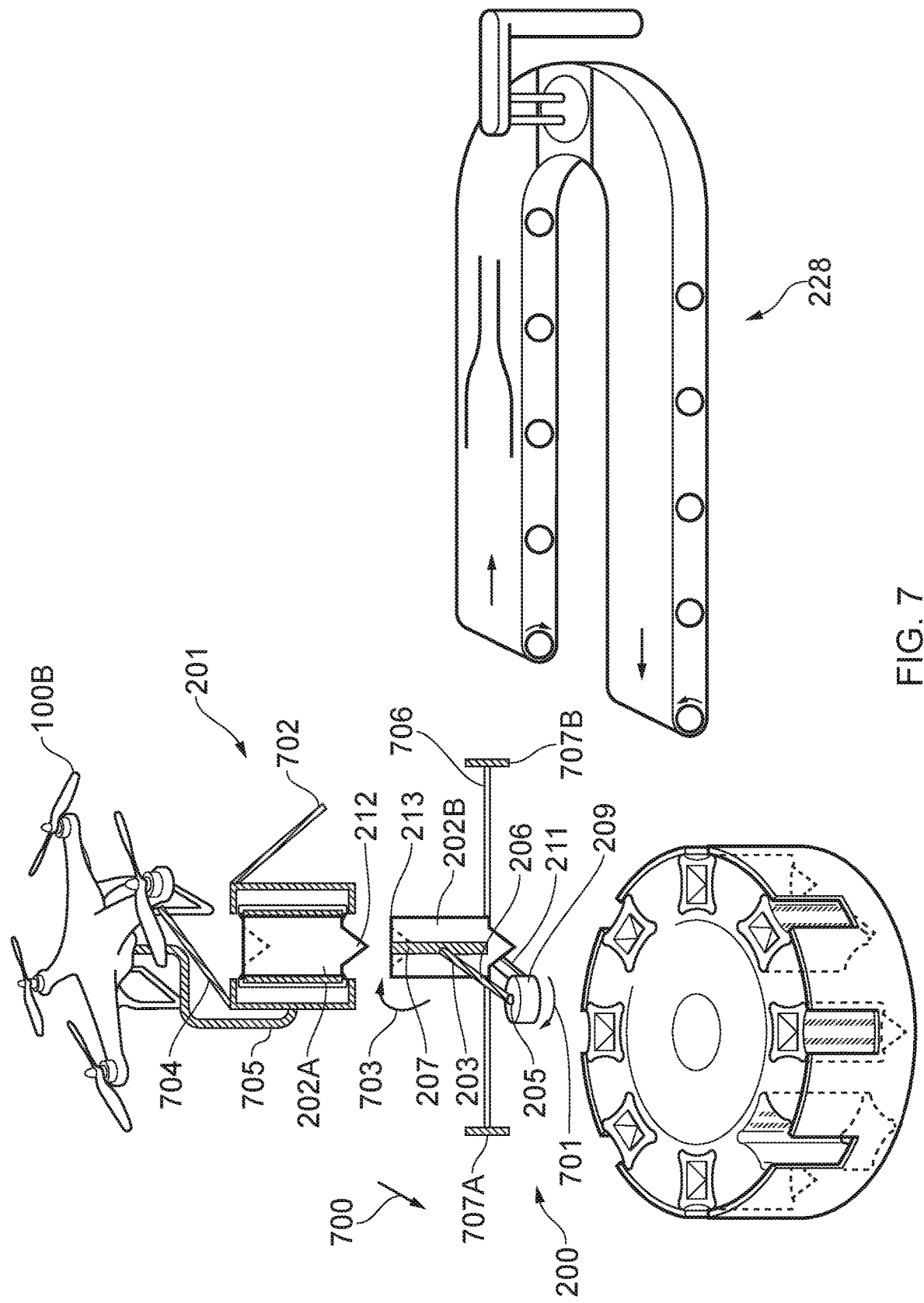

UNMANNED AERIAL VEHICLE

BACKGROUND

Field of the Disclosure

The present disclosure relates to an unmanned aerial vehicle (UAV).

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Unmanned aerial vehicles (UAVs) are becoming popular in a number of applications, including aerial photography, parcel delivery and the like. UAVs are vehicles which travel through the air and are unmanned (that is, they are not controlled by a human user travelling on-board the UAV). UAVs may be electrically propelled (e.g. by a propeller powered by an electric motor) or propelled by other means (e.g. by burning a combustible fuel such as kerosene). Even non-electrically propelled UAVs, however, often require electrical power for on-board electrical systems (e.g. navigation systems, communication systems and the like). UAVs often incorporate a battery to power the UAV's propulsion and/or on-board systems.

A problem is that a battery contains a finite amount of electrical power and must therefore be regularly recharged. This requires the UAV's operation to be regularly interrupted to enable the UAV to return to a predetermined location at which its battery can be recharged. The UAV must then wait until the battery is sufficiently recharged before it can return to its operation. This results in significant UAV down time in which the UAV cannot be used.

One proposal is to replace a UAV's depleted battery with a newly charged battery instead of charging a depleted battery when it remains installed in the UAV. This can reduce the UAV down time because the UAV no longer has to wait until its battery has been recharged. Rather, it must only wait for the battery replacement operation to be completed. A problem, however, is how to undertake UAV battery replacement efficiently.

SUMMARY

The present disclosure is defined by the claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3A and 3B schematically show an example UAV battery;

FIGS. 4A and 4B schematically show an example UAV battery holding portion for a fixed-wing UAV;

FIGS. 5A and 5B schematically show an example battery station replacement battery holding portion;

FIGS. 6A to 6C schematically show an example UAV battery replacement operation;

FIG. 7 schematically shows an example rotary wing UAV battery replacement system for a rotary wing UAV;

DESCRIPTION OF THE EMBODIMENTS

Figure 1A:
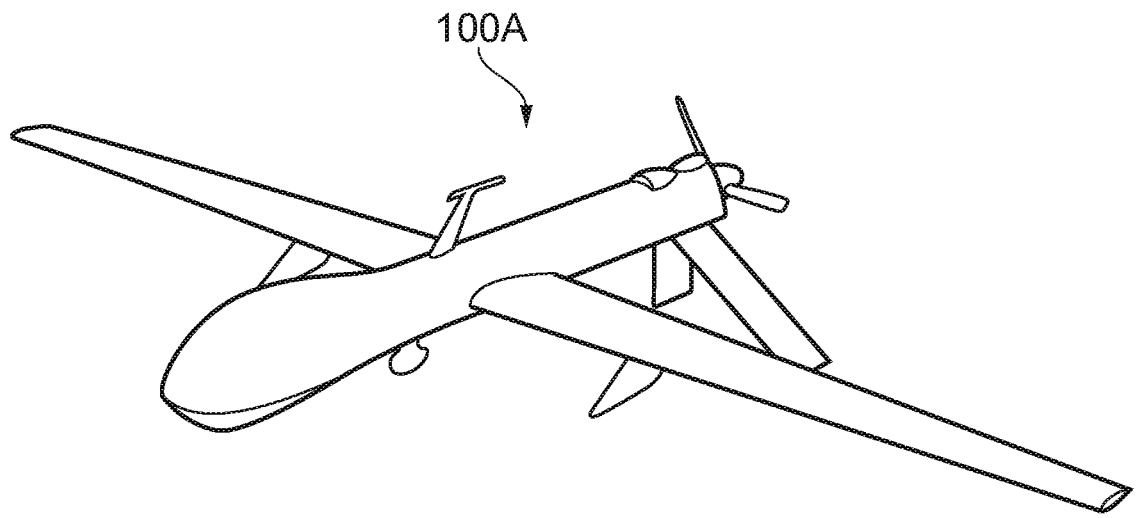
FIGS. 1A and 1B schematically show example UAVs.

Referring now to the drawings, wherein like reference numerals designate identical or corresponding parts throughout the several views.

Figure 1B:
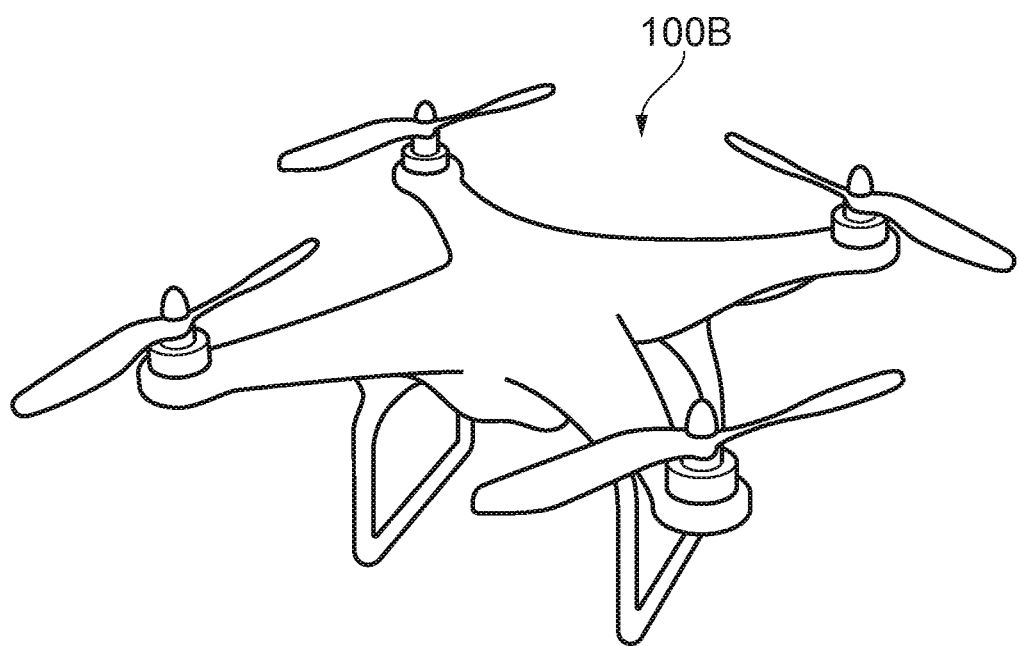

FIGS. 1A and 1B show example types of UAVs. FIG. 1A shows a fixed-wing type UAV 100A and FIG. 1B shows a rotary type UAV 100B. The present disclosure relates to allowing UAVs such as these to quickly change their battery whilst in flight. In particular, the present disclosure allows a first battery to be replaced by a second battery by way of the second battery contacting the first battery, pushing it out and taking its place in a battery bay of the UAV. This occurs under the momentum of the UAV is it flies.

A battery bay may be considered to be a compartment, not necessarily wholly enclosed, for holding a battery which powers (at least in part) the UAV. It may retract into the main body whilst in flight for example using a stepper motor or hydraulic mechanism. It may be fixed to the structure of the UAV, for example under the main body or a wing. The exterior of the battery bay may be shaped such as to have aerodynamic properties to reduce drag. The exterior of the battery bay may be configured such as to increase drag and slow the UAV as it lands for a battery exchange. There may be more than one battery bay in a UAV.

Figure 2:
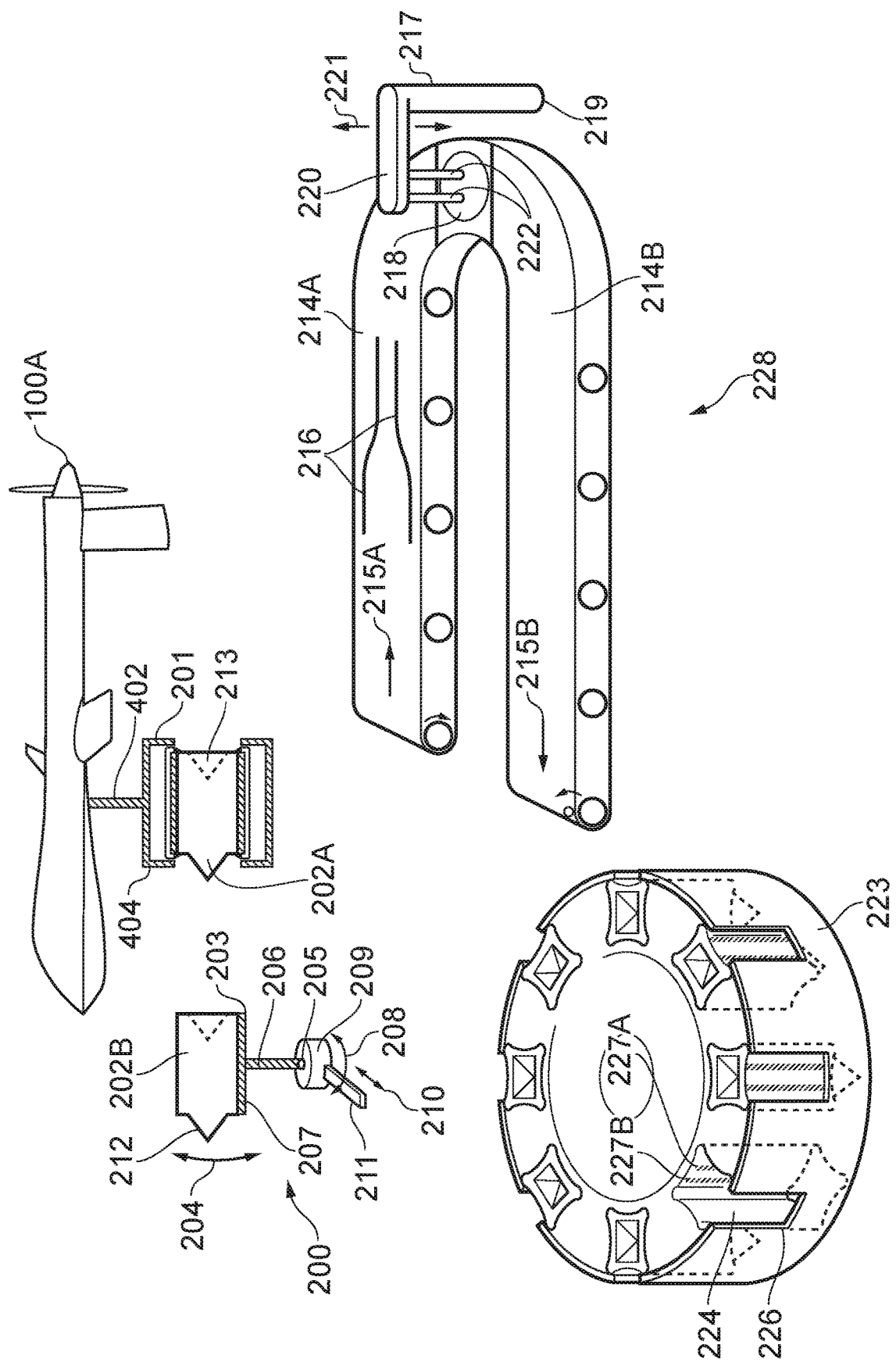
FIG. 2 schematically shows an example UAV battery replacement system for a fixed-wing UAV.

FIG. 2 shows such an example battery exchange system 228 for the fixed-wing type UAV 100A. The UAV 100A has a battery bay 201 which is shown as exposed in FIG. 2 and which comprises a first battery 202A. The battery bay 201 is shown in a cut-away view so that the battery 202A within the battery bay can be seen in FIG. 2. In reality, the battery 202A will not be seen in the battery bay when the UAV 100A is viewed from the perspective shown in FIG. 2. The battery bay comprises a shell 404 and a column 402, to be described later. The UAV 100A is approaching a battery station 200. The battery station 200 comprises a second battery 202B releasably attached to a stand 203. The stand 203 comprises a battery holding portion 207 and a support shaft 206. The stand 203 is mounted on a support portion 209. The support portion 209 is rotatable in the direction of the arrows 208 and slidable along a rail 211 in the direction of the arrows 210. The support shaft 206 is mounted to the support portion 209 by way of a pivot 205, which allows the stand 203 (and therefore the battery 202B) to move about the pivot in the direction indicated by the arrows 204. This allows the position of the battery 202B to be adjusted so as to optimise the position of the battery 202B in preparation for making contact with the battery 202A held in the battery bay 201 of UAV 100A as it flies, pushing the battery 202A out of the battery bay 201 and positioning itself in the battery bay 201 in place of the battery 202A. Upon being correctly positioned in the battery bay 201, the battery 203 is released from the battery holding portion 207 of the stand and the UAV 100A is thus able to fly off, its battery replaced. Note that this is done at least with a contribution from the force of impact between the batteries 202A and 202B as the UAV 100A flies past the battery station 200. The batteries 202A and 202B each comprise a tapered protrusion 212 and a tapered cavity 213 with a shape which complements the shape of the tapered protrusion 212. Upon contact of the batteries 202A and 202B, the protrusion 212 of the battery 202A enters the cavity 213 of the battery 202B. This aligns the batteries 202A and 202B as they come into contact, thereby allowing the battery exchange to occur smoothly.

In embodiments, the protrusion 212 may be shaped at least in part as pyramidal, conical or frustroconical with a respectively complementary cavity 213. The shape of protrusion 212 may be geometrically irregular. The battery as mentioned herein may comprise a plurality of cells in a package. Such cells may be for example Li-ion or Li-polymer cells. Embodiments of the disclosure therefore provide that the entrance or approach of the UAV into the battery station 200 does not require total precision; the alignment of the batteries may compensate for an inaccurate entry or approach for example caused by calibration error or other factors such as wind or weather conditions. The engagement of the protrusion 212 into the cavity 213 may provide a final guide for the UAV into battery station 200.

Upon ejection of the battery 202A from the battery bay 201, the battery 202A lands on a first conveyor belt 214A (an example of a transporter), which is moving in the direction of the arrow 215. The battery 202A is then aligned lengthways by tapered channelling walls 216. The tapered channelling walls 216 are walls which form a channel through which the battery 202A travels. The distance between the walls is gradually reduced along the direction of travel of the battery 202A along the conveyor belt 214A so that battery 202A is aligned lengthways along its direction of travel.

After being aligned and reaching the end of the first conveyor belt 214A, the battery arrives at an analysis device 217 and turntable 218. The analysis device 217 comprises a support column 219 and an arm 220 slidably attached to the support column 219. An electric motor (not shown) causes the arm 220 to move up and down relative to the support column 219 in the direction of the arrows 221. The arm 220 comprises two electrodes 222 configured to contact positive and negative terminals of the battery 202A (the arm 220 is movable in a downwards direction until the electrodes 222 each contact a respective one of the positive/negative battery terminals). The contact between the electrodes 222 and the battery terminals allows a voltage output by the battery to be measured by appropriate circuitry (not shown) of the analysis device. This allows the remaining charge of the battery to be determined. Furthermore, depending on the polarity of the measured voltage (which will be either positive or negative, depending on which of the positive/negative terminals each of the electrodes 222 makes contact with and, thus, on the orientation of the battery), the turntable 218 is configured to rotate the battery 202A by 180 degrees in order to ensure that the battery is at a predetermined orientation. The voltage measuring circuitry controls an electric motor (not shown) to rotate the turntable depending on the measured voltage polarity. The battery should be orientated such that the end with the protrusion 212 is at the front in the direction of travel of the battery. The terminals on the battery are arranged such that the voltage polarity should be positive (or negative) when the battery is correctly orientated. Thus, if the measurement of the battery voltage by the electrodes 222 is positive (or negative), then the orientation of the battery is not changed (that is, the turntable 218 does not turn the battery). On the other hand, if the measurement of the battery voltage by the electrodes 222 is negative (or positive), then the orientation of the battery is changed (that is, the turntable 218 does turn the battery). Other sensors may be present such as an NFC sensor which reads a Near Field Communications, NFC, device in the battery. The NFC device may contain authenticity information pertaining to the battery which transfers to the sensor. The NFC device may contain information written to the NFC device by the UAV such as information pertaining to the journey undertaken by the UAV. Such information may be transferred to the sensor. In embodiments, with NFC read/write devices mounted in the protrusion 212 and cavity 213, information could be transferred from battery to battery at the point of battery exchange. This may for example provide an audit trail, logging information or enable some statistical analysis when information from a battery is retrieved.

The battery 202A is then passed to a second conveyor belt 214B (an example of a transporter), which is moving in the direction of the arrow 215B. The battery 202A (now correctly orientated) travels along the second conveyor belt 214B until it reaches a charging carousel 223 (an example of a charger). The charging carousel 223 comprises a plurality of charging cavities, each shaped so as to receive and contain a battery. As the battery approaches the end of the second conveyor belt 214B, the charging carousel 223 is rotated such that an empty charging cavity 224 is positioned at the end of the second conveyor belt. When the battery 202A reaches the end of the second conveyor belt 214B, it will drop under gravity into the empty charging cavity. Due to the battery 202A having been previously orientated such that its protrusion 212 is positioned at the front in the direction of travel, the battery drops protrusion-first into the empty charging cavity 224. The charging cavities other than empty charging cavity 224 each contain a battery in this example. Each charging cavity 224 comprises a pair of charging contacts 227A and 227B which are connected to a power supply (not shown) and which make electrical contact with the terminals of the battery positioned within that charging cavity so as to electrically charge the battery. Each battery comprises a pair of battery terminal portions 303A and 303B which respectively make electrical contact with the charging contacts 227A and 227B when battery is held in the charging cavity.

Each charging cavity comprises a notch 226 such that a surface of the battery held in the charging cavity is exposed. This allows the battery holding portion 207 of the stand 203 to engage with the exposed battery surface. In embodiments, the exposed battery surface is magnetically attracted to the battery holding portion 207. The stand 203 (by rotation of the various battery station components in the directions of the arrows 204, 208 and 210) is thus able to pick up a battery from the charging carousel 223 and suitable position that battery so as to allow that battery to replace the battery of the next UAV 100A which flies in for a battery change.

FIGS. 3A and 3B show perspective views of an example battery 202 (of which batteries 202A and 202B are examples). FIG. 3A shows a front perspective view (showing the tapered protrusion 212) and FIG. 3B shows a rear perspective view (showing the tapered cavity 213).

The battery 202 is substantially cuboidal in shape. At one end, there is a flat face 300A on which the tapered protrusion 212 is formed. The cross-sectional area of the tapered protrusion 212 is less than that of the flat face 300A and the tapered protrusion 212 is positioned centrally on the flat face 300A, thereby resulting in a portion 301 of the flat face 300A bordering the tapered protrusion 212 remaining exposed. Similarly, at the other end, there is a flat face 300B within which the tapered cavity 213 is formed. The cross-sectional area of the tapered cavity 213 is less than that of the flat face 300B and the tapered cavity is positioned centrally on the flat face 300A, thereby resulting in a portion 302 of the flat face 300B bordering the tapered cavity 213 remaining exposed. The exposed portions 301 and 302 of the flat faces 300A and 300B allow the battery to engage with one or more retractable lugs for holding the battery in place in the battery bay 201 of the UAV.

The four surfaces 305A-D (of which 305B and 305A are visible in FIG. 3A and of which 305B and 305C are visible in FIG. 3B) connecting the flat faces 300A and 300B are each identical and concave in shape such that the battery 202A has a constant cross section when viewed from either of the ends defined by the flat faces 300A and 300B. Each of the surfaces 305A-D comprises a pair of battery terminal portions 303A and 303B (which are positive and negative, respectively, or vice versa). In embodiments, the positive battery terminal portions of the surfaces 305A-D are electrical conductors all of which are connected to the same positive terminal of the battery 202. Similarly, the negative battery terminal portions of the surfaces 305A-D are electrical conductors all of which are connected to the same positive terminal of the battery 202. The battery 202 can therefore be charged or discharged by connecting charging or discharging electrodes, respectively, to the battery terminal portions 303A and 303B of any one of the surfaces 305A-D. The orientation of the battery surfaces 305A-D when the battery lands on the first carousel therefore does not matter because, whatever the orientation of the surfaces 305A-D, one set of battery terminal portions 303A and 303B will engage with the charging contacts 227A and 227B of the charging cavity (allowing the battery to be charged). Also, when the battery is placed within the battery bay 201, one set of battery terminal portions 303A and 303B will engage, respectively, with electrodes 408A and 408B of the battery bay 201, therefore allowing electrical power to be supplied to the UAV 100A by the battery. Each of the battery terminal portions 303A and 303B comprises a strip of electrically conductive material extending along the length of the battery from one end of the battery to the other (each end of the battery being defined by one of the flat faces 300A and 300B).

FIGS. 4A and 4B show the battery bay 201 in more detail. The battery bay comprises a shell 404 and a column 402. The column 402 attaches the shell 404 to the main body of the UAV 100A. The shell defines an internal space 405 for receiving the battery 202. FIG. 4A shows a perspective view of the battery bay 201 as viewed from the front of the UAV 100A as it travels. FIG. 4B shows the same view of the battery bay 201 rotated by 180 degrees so that the internal space 405 defined by the shell 404 can be seen more clearly. In embodiments, column 402 and the bay 201 may retract at least in part into the body of the UAV.

The internal space 405 is dimensioned so that the battery enters the internal space via opening 400 and is secured in place within the internal space 405. During a battery exchange operation, upon making contact with a replacement battery, the battery may then exit the internal space via exit 401. Whilst the UAV 100A is flying, the battery is held in place in the internal space by way of ribs 406, which each engage with a respective edge defined between two of the surfaces 305A-D, and by way of retractable lugs 403A and 403B. The ribs are separated along the length of the shell 404 by way of by a distance $w_1$. The shell 404 comprises two planar side walls 407A and 407B and a convex top wall 407C. It is not necessary for the walls to be solid; they may comprise a frame with apertures to provide rigidity or stiffness whilst saving material and weight. The convex shape of the top wall 407C complements the concave shape of the surfaces 305A-D of the battery. The battery is thus secured in place in the internal space by way of the lugs 403A and 403B, ribs 406, side walls 407A and 407B and top wall 407C such that relative movement between the battery and shell is prevented.

The top wall 407A comprises a pair of electrodes 408A and 408B. When the battery is held within the internal space 405, the convex surface of the top wall 407A engages with the concave surface of one of the battery surfaces 305A-D (the one of the battery surfaces depending on the orientation of the battery when it enters the internal space). This causes the electrodes 408A and 408B to electrically contact, respectively, the battery terminals 303A and 303B on that battery surface. The electrodes 408A and 408B are electrically connected to the electrical components (not shown) of the UAV 100A, thereby allowing the electrical components of the UAV to be powered by the battery.

FIGS. 5A and 5B show the stand 203 in more detail. As shown in FIG. 5A, the stand 203 comprises the support shaft 206 on which the battery holding portion 207 is mounted. The battery holding portion comprises a support layer 501 and in some embodiments a permanent magnet layer 500. The support shaft 206 and support layer 501 may be formed from a single piece of rigid material. The permanent magnet layer 500 comprises a permanently magnetic material to which ferromagnetic materials such as iron, nickel and cobalt are attracted. The battery terminal portions 303A and 303B comprise a ferromagnetic material which is attracted to the magnetic layer 500. Alternatively or in addition, a portion of each of the surfaces 305A-D of the battery other than the battery terminal portions 303A and 303B may comprise a ferromagnetic material which is attracted to the magnetic layer. The magnetic layer has a convex shape which complements with and engages with the concave shape of the battery surfaces 305A-D. Thus, a battery 202 located in a charging cavity 224 of the charging carousel 223 may be extracted from the charging cavity by way of the battery surface exposed by the notch 226 of the charging cavity being attracted to the permanent magnet layer 500 of the battery holding portion 207 and engaging with the magnetic layer. When the support shaft 206 is then rotated about the pivot 205, the battery is extracted from the charging cavity and is releasably mounted on the battery holding portion 207 via the magnetic attraction between the battery surface (battery surface 305D in this case) and permanent magnet layer 500. This is shown in FIG. 5B. The battery can then be positioned as exemplified in FIG. 2 so as to be ready to replace a battery in the battery bay 201 of the UAV 100A when it flies towards the battery station 200. The complementary concave shape of the battery surface and convex shape of the magnetic layer 500 helps alleviate rotational movement of the battery relative to the battery holding portion 207, thereby helping to ensure that the battery is correctly positioned for UAV battery replacement. In embodiments, instead of or in addition to the use of magnetic layer 500, the battery may be releasably secured in a top layer of the stand, the top layer forming a slot, ratchet or geared mechanism providing sufficient resistance for battery exchange to take place under the force of landing.

The width $w_2$ of the battery holding portion 207 is less than the width $w_1$ defined between the ribs 406 of the shell 404 of the battery bay 201. This allows the battery to enter the internal space 405 of the shell whilst still attached to the battery holding portion 207. The battery then pushes out the old battery to be replaced in the internal space and, once the battery is secured within the internal space 405 by way of the lugs 403A and 403B, the battery is pulled away from the magnetic layer 500 of the battery holding portion 207 by the momentum of the UAV 100A. The battery holding portion 207 is then free to pick up another battery to facilitate a future UAV battery change. The strength of the magnetic attraction between the battery surface and permanent magnet layer 500 is determined to be large enough to securely hold the battery 202B in position as the battery 202A of the UAV to be replaced initially makes contact with the battery 202B but small enough such that the battery 202B is released from the battery holding portion 207 once the battery 202B is secured in place within the shell 404.

FIGS. 6A to 6C show an example mechanism by which a first battery 202A held in the battery bay 201 of the UAV 100A is replaced by a second battery 202B. Each of FIGS. 6A to 6C is a view of the battery bay 201 shown from an aerial perspective with the top wall 407C cut-away.

FIG. 6A shows the situation at a first time at which the first battery 202A is held in the battery bay 201 and the UAV 100A is approaching the second battery 202B held by the stand 203 (not seen in FIG. 6A). The second battery 202B is secured within the internal space 405 defined by the shell 404. More specifically, the battery 202B is held between respective inner surfaces 603 of the walls 407A and 407B and between sets of retractable lugs 403A and 403B. The top two lugs of the sets of lugs at each end of the shell 404 are seen in FIG. 6A. Each lug 403A at one end of the shell is connected to a corresponding lug 403B at the other end of the shell via a rigid connecting portion 601, which extends through a channel defined within a respective one of the walls 407A and 407B. For clarity, the connecting portion 601 is denoted for the top two lugs 403A and 403B for the wall 407B only. However, the other lugs (in particular, the bottom two lugs for the wall 407B and the top and bottom two lugs for the wall 407A) are connected by a connecting portion in the same way with the same configuration. The connecting portion 601 of the wall 407B is connected to an inner surface of the wall channel via a pivot 602 and a compression spring 600 (the spring is an example of a member which is resilient when compressed under a mechanical force).

Each of the lugs 403A comprises a pair of flat surfaces which taper in a direction from the inner surface 603 towards the internal space 405 defined within the shell 404. A first one of the flat surfaces of each lug 403A is substantially flush with the exposed flat portion 301 of the battery 202A, thus holding the battery in place in the shell 404. A second one of the flat surfaces of the lug 403A is exposed so as to make contact with the exposed flat portion 302 of the new battery 202B during the battery exchange. Each of the lugs 403B also comprises a pair of flat surfaces which taper in a direction from the inner surface 603 towards the internal space 405 defined within the shell 404. A first one of the flat surfaces of each lug 403B is substantially flush with the exposed flat portion 302 of the battery 202A, thus holding the battery in place in the shell 404. A second one of the flat surfaces of the lug 403B is exposed.

As shown in FIG. 6B, during the battery exchange, the exposed flat portion 302 of the new battery 202B pushes on the second flat surface of each lug 403A. This causes the lug 403A and connecting portion 601 to rotate about the pivot 602, compressing the spring 600. The rotation results in the lug 403A retracting into the cavity in the wall 407B and in the connecting portion 601 pulling the lug 403B so that the lug 403B is also retracted into the cavity in the wall 407B.

The retraction of the lugs 403A allows the new battery 202B to make flush contact with the old battery 202A (so that the protrusion 212 of the old battery 202A enters and sits flush within the cavity 213 of the new battery, the protrusion 212 and cavity 213 being complementary shapes). The retraction of the lugs 403B allows the old battery 202A to slide out of the internal space 405 and onto the first conveyor belt 214A. Under the momentum of the UAV, the new battery 202B is thus able to make contact with, push out and replace the old battery 202A in the internal space 405.

As the old battery 202A is pushed out of the internal space by the new battery 202B, the boundary 604 between the batteries reaches the tapered ends of the lugs 403B and the old battery 202A falls out of the shell 404. The lugs 403A and 403B are then urged back to their original position by the spring 600 such that the first one of the flat surfaces of each lug 403A becomes substantially flush with the exposed flat portion 301 of the new battery 202B and the first one of the flat surfaces of each lug 403B becomes substantially flush with the exposed flat portion 302 of the new battery 202B. The lugs 403A and 403B thus secure the new battery 202B in place within the shell 404. This situation is shown in FIG. 6C.

FIG. 7 shows the example battery exchange system 228 when the UAV is a rotary type UAV 100B instead of a fixed-wing type UAV 100A. The arrangement shown in FIG. 7 is the same as that shown in FIG. 2 except that the position of the new battery 202B has been adjusted in order to allow battery replacement for the UAV 100B, which approaches the battery station 200 vertically instead of horizontally. The position of the new battery has been adjusted by adjusting the position of the stand 203 so that the direction of the cavity 213 of the new battery 202B points upwards so as engage with the protrusion 212 of the old battery 202A and so that the old battery 202A is pushed out by the new battery 202B as the UAV approaches the new battery vertically. The position of the stand 203 has been adjusted by the support portion 209 moving along the rail 211 in the direction of the arrow 700, the support portion 209 rotating by 90 degrees in the direction of the arrow 701 and the support shaft 206 rotating about the pivot 205 by 90 degrees in the direction of the arrow 703. The movement of the support portion along the rail 211 helps ensure that the UAV 100B encounters the new battery 202B at substantially the same spatial position relative to the first conveyor belt 214A as described for the UAV 100A, thereby allowing the ejected old battery 202A to land on the first conveyor belt 214A.

Figure 8:
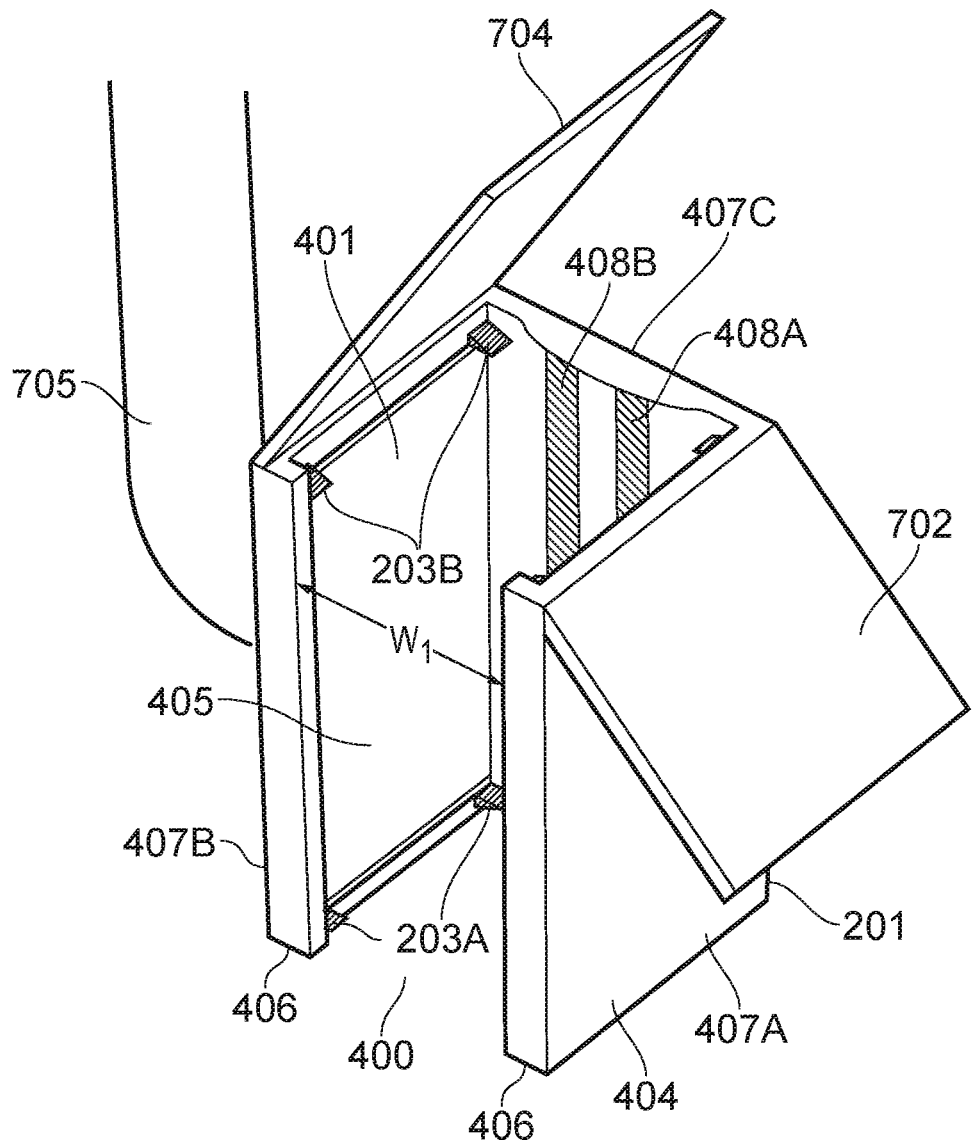
FIG. 8 schematically shows an example UAV battery holding portion for a rotary-wing UAV.

The battery bay 201 of the UAV 100B is the same as the battery bay 201 of the UAV 100A, but comprises a number of additional features so as to enable ejection of the old battery 202A onto the first conveyor belt 214A, as shown in FIG. 8. The battery bay 201 is the same as the battery bay 201 shown in FIGS. 4A and 4B. It is, however, shown as rotated by 90 degrees (clockwise in a direction into the page), since this is the orientation of the battery 201 when fitted to a rotary type UAV 100B which travels vertically in order to conduct a battery change (rather than horizontally as with fixed-wing UAV 100A).

For the battery bay 201 of FIG. 8, the column 402 supporting the shell 404 has been replaced with a support arm 705 comprising a number of bends. This enables the battery bay to be suspended from a main body of the UAV 100B at a central location relative to the main body of the UAV 100B, thereby helping to keep the centre of mass of the UAV 100B at a substantially central location. The shell 404 also comprises a deflector plate 704 and a ramp 702. As the old battery 202A is ejected from the internal space 405 defined within the shell 404 via the exit 401, the deflector plate 704 guides the battery in the direction of the ramp 702. The battery then travels down the ramp under gravity, thereby landing on the first conveyor belt 214A. The deflector plate 704 and ramp 702 therefore help ensure that, even though the old battery exits the shell 404 in a vertical direction, it is guided and deposited under gravity on the conveyor belt 214A. Collection and recharging of the old battery is thus made easier.

The arrangement of FIG. 7 comprises a resilient member 706 supported between two supports 707A and 707B and positioned underneath the new battery 202B. The resilient member is, for example, a resilient web or sheet comprising a hole through which the tapered protrusion 212 of the new battery 202B extends so that the exposed portion 301 of the flat surface 300A of the new battery 202B is flush with the resilient web or sheet. During the battery exchange operation, the contact between the new battery 202B and the old battery 202A and, subsequently, between the battery bay 201 and the resilient member 706 causes an impulse to be imparted on the resilient member 706. The impulse causes the resilient member to resiliently deform and, once the new battery 202B is in place in the battery bay 201, to exert an elastic force in an upwards direction on the battery bay 201 as the resilient member returns to its original form. This upwards elastic force facilitates the UAV's vertical take-off following its vertical landing to conduct the battery exchange operation.

The battery bay 201 of the UAV 100A and 100B may be retractable so that, during normal flight, the battery bay 201 is contained within the main body but, as the UAV approaches the new battery 202B, the battery bay 201 moves outside of the main body to occupy a position like that shown in FIGS. 2 and 7 (the battery bay 201 shown in FIGS. 2 and 7 is not drawn to scale). This protects the battery and improves the aerodynamic characteristics of the UAV during normal flight. A suitable mechanism may be used be to realise the retractable battery bay. For example, the column 402 or support arm 705 may be attached to a wall of an internal cavity in the main body of UAV 100A or 100B via a pivot or track with respect to which the column 402 or support arm 705 is moved by an electric motor and suitable mechanism to retract and expose the battery bay 101 (the mechanism is not shown).

Ways of releasably holding the battery 202 within the battery bay 201 other than through the use of retractable lugs 403A and 403B exemplified in the FIGS. 6A to 6B may be used.

In one example, the battery 202 is friction fitted within the battery bay 201 (that is, held by friction at the points of contact between the battery 202 and an internal surface of the shell 404). The retractable lugs 403A and 403B are therefore not required, facilitating easier manufacture of the battery bay 201.

In another example, an internal surface of the shell 404 comprises a permanent magnet (not shown) which engages with a ferromagnetic material (e.g. the battery terminal portions 303A and 303B) on a surface 305A-D of the battery 202. The battery 202 is thus kept in place in the battery bay 201 by the magnetic attraction between the permanent magnet and the ferromagnetic material.

In another example, an internal surface of the shell 404 comprises an electromagnet (not shown) which engages with a ferromagnetic material (e.g. the battery terminal portions 303A and 303B) on a surface 305A-D of the battery 202. During normal flight, the electromagnet is activated so that the battery 202 is kept in place in the battery bay 201 by the magnetic attraction between the electromagnet and the ferromagnetic material. During a battery exchange, the electromagnet is deactivated (or the magnetic strength of the electromagnet is reduced) so as to allow the old battery 202A to leave the battery bay 201 and the new battery 202B to enter the battery bay 201. Once the new battery 202B is correctly positioned within the battery bay 201, the electromagnet is reactivated (or the electromagnetic strength is restored) so as to keep the new battery 202B in place. Circuitry (not shown) of the UAV controls the operation of the electromagnet by determining a position of the UAV relative to the battery station 200 (e.g. using a Global Navigation Satellite System (GNSS) or beacon signaling between the battery station 200 and UAV). The circuitry deactivates the electromagnet (or reduces the electromagnetic strength) when the UAV is within a predetermined distance of the battery station 200 and reactivates the electromagnet (or restores the electromagnetic strength) when the UAV is outside a predetermine distance of the battery station 200.

In embodiments, the battery station 200 may have a way to impart a relaunch or assistance impulse to the UAV directly after the battery exchange. For example this may be a catapult (for example elastic or mechanical, such as resilient member 706) which is engaged with the structure of the UAV. The engagement of the catapult may take place just as the battery is being exchanged, and controlled in time to release just after battery exchange. In embodiments, this may be a trampoline. It may stretch a membrane as the battery exchange takes place and release directly after battery exchange.

In another example, the retractable lugs 403A and 403B are used but an electric motor (not shown), e.g. a stepper motor, causes the movement of the lugs. During normal flight, the lugs are in an exposed position to engage with the battery 202, thereby keeping the battery 202 in place in the battery bay 201. During a battery exchange, the electric motor causes the lugs to retract so as to allow the old battery 202A to leave the battery bay 201 and the new battery 202B to enter the battery bay 201. Once the new battery 202B is correctly positioned within the battery bay 201, the electric motor causes the lugs to return to their original position, thereby engaging with the new battery 202B and keeping the new battery 202B in place in the battery bay 201. Circuitry (not shown) of the UAV controls the operation of the electric motor by determining a position of the UAV relative to the battery station 200 (e.g. using a Global Navigation Satellite System (GNSS) or beacon signaling between the battery station 200 and UAV). The circuitry controls the electric motor to retract the lugs when the UAV is within a predetermined distance of the battery station 200 and to restore the lugs to their non-retracted position when the UAV is outside a predetermine distance of the battery station 200.

In another example, a combination of different arrangements is used. For example, retractable lugs which undergo movement with an electric motor are used in combination with a magnet (e.g. a permanent magnet or electromagnet) of an internal surface of the shell 404. This combination works in the same way as the previous paragraph describes, except that a magnetic attraction between the magnet and a ferromagnetic material (e.g. the battery terminal portions 303A and 303B) on a surface 305A-D of the battery 202 is maintained throughout the battery exchange procedure to help hold the old battery 202A in place in the battery bay 201 until it is pushed out of the battery bay 201 by the new battery 202B. This helps ensure that the old battery 202A is ejected from the battery bay at the correct moment (so that it lands on the first conveyor belt 214A rather than in an undesirable place). If an electromagnet is used, this may be deactivated when the lugs are engaged with the battery 202, thereby reducing UAV power consumption.

When an internal surface of the shell 404 comprises a magnet (permanent or electromagnet), the magnet may be positioned relative to the internal surface and a surface of the battery 202 may comprise a ferromagnetic material (other than the battery terminal portions 305A and 305B) positioned on the battery such that the magnetic attraction between the magnet of the shell 404 and the ferromagnetic surface of the battery 202 causes the battery to be positioned at a desired position within the shell 404. This facilitates correct positioning of the battery 202 in the shell 404. Correct positioning of the battery may be further facilitated by a surface of the battery 202 comprising a magnet with north and south poles positioned on the battery such that magnetic attraction between the north (south) pole of the battery magnet and south (north) pole of the shell magnet causes the battery 202 to occupy a desired position within the shell. In the previous paragraph's example, correct positioning of the new battery 202B in the battery bay 201 helps ensure that the lugs are able to easily engage with the new battery 202B.

Ways of releasably holding the battery on the battery holding portion 207 other than through the use of a permanent magnet layer 500 may also be used. For example, it will be appreciated that a suitable mechanism using one or more of magnets (permanent or electromagnets), friction or lugs (fixed or mechanically or electrically retractable) may be used in order to hold the new battery 202B in place on the battery holding portion 207 until it replaces the old battery 202A in the battery bay 201.

The battery terminal portions 303A and 303B and electrodes 408A and 408B which extend lengthways along the entire length of the battery 202 and battery bay 201, respectively, ensure that electrical contact between the battery terminal portions 303A and 303B of at least one of the old and new batteries 202A and 202B and the electrodes 408A and 408B is maintained before, during and after the battery exchange operation. This facilitates continuous battery power supply to the UAV during the battery exchange operation. Alternatively or in addition, the UAV comprises a second battery (not shown) to power the UAV during the battery exchange operation. Circuitry (not shown) of the UAV controls the power supplied by the second battery by determining a position of the UAV relative to the battery station 200 (e.g. using a Global Navigation Satellite System (GNSS) or beacon signaling between the battery station 200 and UAV). The circuitry controls the second battery to supply power to the UAV instead of the battery held in the battery bay 201 when the UAV is within a predetermined distance of the battery station 200 and controls the battery held in the battery bay 201 to supply power to the UAV instead of the second battery when the UAV is outside a predetermined distance of the battery station 200.

Figure 9B:
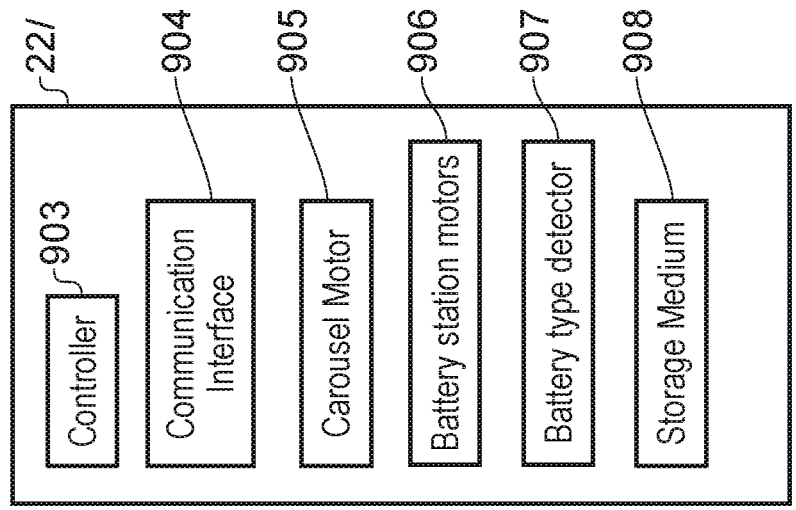
FIGS. 9A and 9B schematically show example electronic components of a UAV and UAV battery replacement system.
Figure 9A:
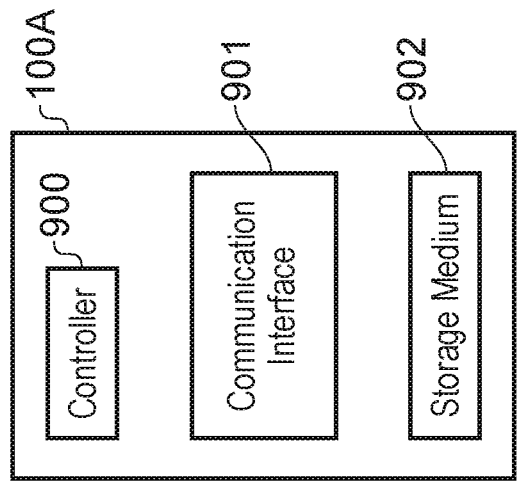

FIGS. 9A and 9B exemplify further components of the UAV 100A and system 228, respectively. The UAV 100B may also contain the exemplified components.

The UAV 100A comprises a communication interface 901 for performing wireless communication (e.g. radio communication) with the system 228 and a storage medium 902 for storing digital data (e.g. a hard disk drive, solid state drive, tape drive or the like). Each of these components is controlled by the controller 900. The controller 900 comprises the circuitry which performs other operations of the UAV 100A mentioned above.

The system 228 comprises a communication interface 904 for performing wireless communication (e.g. radio communication) with the UAV 100A, an electric carousel motor 905 for rotating the carousel 223 (this being mechanically installed at the carousel), one or more electric battery station motors 906 for controlling the movement of the support portion 209 along the track 211, the rotation of the support portion 209 and the rotation of the support shaft 206 about the pivot 205 (this being mechanically installed at the battery station 200), a battery type detector 907 for detecting a type of battery travelling along the conveyor belts 215A and 215B and a storage medium 908 for storing digital data (e.g. a hard disk drive, solid state drive, tape drive or the like). Each of these components is controlled by the controller 903. The controller 903 is implemented using appropriate circuitry. Although shown together in FIG. 9B, the components shown in FIG. 9B are at different spatial locations within the system 228 and are housed in appropriate housings (not shown), for example.

The communication interfaces 901 and 904 allow communication between the UAV 100A and system 228. This communication may comprise the above-mentioned beacon signaling to facilitate the battery exchange operation.

In one example, different types of battery are available to UAVs which make use of the system 228. For example, batteries of different capacity may be available. These are selectable based on scheduling data stored in the storage medium 902 of a UAV indicating how far the UAV must travel prior to the next battery change. UAVs travelling a further distance may desire a higher capacity (but heavier weight) battery whereas UAVs travelling a shorter distance may desire a lower capacity (but lighter weight) battery. In another example, different UAVs may require batteries with a different physical shape or different electrical characteristics. Different batteries may be required of provided for operating in different climatic conditions or operating altitudes. This may form part of the scheduling data.

As a UAV approaches the battery station 200 in order to conduct a battery exchange operation, the UAV transmits a signal to the system 228 indicating the type of battery required by the UAV The signal may carry an identifier for the UAV. Data indicative of the required battery type is stored in the storage medium 902 of the UAV. The storage medium 908 stores a database. Each charging cavity 224 in the carousel 223 is identified in the database with the type of battery it contains (or, if empty, a charging cavity 224 is identified as empty in the database). Based on the received UAV signal, the controller 903 looks up the battery type in the database in order to identify which of the charging cavities comprises the desired battery. The controller 903 then controls the carousel motor 205 to rotate until the identified charging cavity is positioned such that the battery is removable from the identified charging cavity by the battery station 200. The controller then controls the one or more battery station motors 906 to cause the battery station 200 to remove the battery from the identified charging cavity and to position the battery ready for the battery exchange operation. The controller 903 therefore acts as a selector of the new battery. The signal transmitted by the UAV to the system 228 also includes the UAV type (e.g. fixed wing 100A or rotary 100B). Data indicative of the UAV type is stored in the storage medium 902 of the UAV. The controller 903 therefore controls the one or more battery station motors 906 to position the removed battery (which is a new battery 202B) appropriately based on the signal (e.g. if the signal indicates the UAV is fixed wing 100A then the new battery 202B is positioned as shown in FIG. 2 and if the signal indicates the UAV is rotary 100B then the new battery 202B is positioned as shown in FIG. 7).

After the battery exchange operation, the type of the old battery 202A is detected by the battery type detector 907. The battery type detector 907 is co-located with the analysis device 217, for example (allowing the battery type detection and battery orientation correction to occur simultaneously). All batteries comprise an identifier which identifies its type. In one example, the battery type detector 907 comprises an image sensor and the battery identifier is a Quick Response (QR) code readable by the image sensor. In another example, the battery type detector 907 comprises a radio frequency identity device (RFID) detector and the battery identifier is an RFID tag. It is appreciated that other identification methods may be used. The controller 903 then identifies an empty charging cavity 224 using the database of the storage medium 908 and controls the carousel motor 905 to rotate until the empty charging cavity is positioned such that the old battery 202A drops into the empty charging cavity under gravity for charging when it reaches the end of the second conveyor belt 215B. A charging cavity becomes empty when the battery station 200 removes a battery from the charging cavity for the removed battery to be a new battery 202B in a battery exchange operation. Each charging cavity comprises a sensor (not shown) which sends a signal to the controller 903 when a battery is removed from the charging cavity, for example. The controller 903 then identifies the charging cavity as empty in the database of the storage medium 908 in response to this signal.

The controller 903 may receive a signal from the electrodes 222 of the analysis device 217 indicating the measured voltage of an ejected battery 202A. The voltage of the ejected battery is related to the remaining battery power. The controller 903 compares the measured voltage of the battery to data stored in the storage medium 908 indicating the relationship between the measured voltage and remaining battery power for the battery type (known from the battery type detector 907). If the measured voltage is below a predetermined threshold, it is confirmed that the remaining battery power is sufficiently low that it was appropriate for the UAV to conduct the battery exchange operation. If the measured voltage is above the predetermined threshold, it is confirmed that the remaining battery power is not sufficiently low that it was appropriate for the UAV to conduct the battery exchange operation. Here, there may be a fault with the UAV because it conducted a battery exchange operation due to having a low battery even though this wasn't the case. The system 228 therefore transmits a signal to the UAV informing the UAV of a potential fault. The UAV may therefore visit a maintenance station (not shown) to be checked and serviced/repaired if necessary.

The UAV may exchange a battery for reasons other than a low battery. For example, whilst flying, the UAV may receive a scheduling signal from a base station (not shown) commanding the UAV to undertake a longer distance journey than is possible with the UAV's current battery (e.g. if the UAV is carrying a standard capacity battery for journeys of a standard distance instead of a high capacity battery for journeys of an extended distance). When approaching the battery station 200 for a battery exchange, the UAV may transmit a signal to the battery station 200 indicating the reason for the battery change (e.g. low power, higher capacity battery needed or the like). The signal identifies the UAV and the battery (each battery having an identifier unique to the battery as well as having a battery type identifier—the unique battery identifier may be provided with the battery type identifier for detection by the battery type detector 907, for example). The information indicated by the signal is stored in a database in the storage medium 908 (e.g. in the form UAV ID: X, battery ID: Y, reason: Z). When the analysis device 217 measures the voltage of battery Y, the controller 903 looks up "battery ID: Y" in the database and determines the UAV ("X") and reason ("Z"). If the reason Z is that the battery power was low but the measured voltage of the analysis device 217 indicates that the battery power is not low, then the controller 903 determines that there is a fault with the UAV and controls the communication interface 904 to transmit a signal to the UAV indicating the fault. On the other hand, if the reason Z is that a higher capacity battery is required, then even if the measured voltage of the analysis device is not low, the controller 903 knows that this is not the reason for the battery exchange and that there is no fault with the UAV.

The UAV may transmit a signal indicating any type of measurable data about a battery to be replaced as it approaches the battery station 200 for a battery exchange. The controller 903 may then measure the same data using analysis device 217 and compared it to the received data. This helps to ensure the battery monitoring systems of the UAV are working correctly and allows the UAV to be alerted if a problem is detected.

The battery 202 can have a different number of sets of terminals 303A and 303B than the four sets (one set on each surface 305A-D) shown in FIGS. 3A and 3B. For example, only one set of terminals may be used. In order to facilitate electrical contact between the one set of terminals 303A and 303B and the charging contacts 227A and 227B during charging and between the terminals 303A and 303B and electrodes 408A and 408B when the battery is installed in the UAV, the system 228 comprises a further battery orientation device (not shown) for orientating the battery so that the terminals 303A and 303B are on the top surface of the battery when it is placed on the second conveyor belt 215B. This facilitates correct orientation of the one set of battery terminals 303A and 303B when the battery enters the charging cavity and when it is removed from the charging cavity by the battery holding portion for placement in the battery bay 201 of the UAV.

The described embodiments are examples of how the present disclosure may be implemented.

For example, the present disclosure more generally relates to an unmanned aerial vehicle (UAV, e.g. UAV 100A or 100B) comprising a battery holding portion (e.g. battery bay 201) configured to releasably hold a first battery (e.g. battery 202A) to provide electrical power to the UAV, the battery holding portion being configured to hold the first battery in a position relative to a direction of travel of the UAV such that, upon the UAV encountering a second battery (e.g. battery 202B) positioned in the path of travel of the UAV, the first battery receives a mechanical impulse from the second battery causing the first battery to be released from the battery holding portion and the second battery replaces the first battery to become held by the battery holding portion to provide electrical power to the UAV.

For example, the present disclosure more generally relates to a battery replacement apparatus (e.g. battery station 200) for providing replacement of a battery releasably held by a battery holding portion (e.g. battery bay 201) of an unmanned aerial vehicle (UAV, e.g. UAV 100A or 100B) the apparatus comprising a replacement battery holding portion (e.g. battery holding portion 207) for releasably holding a second battery (e.g. battery 202B) for replacing a first battery (e.g. battery 202A) releasably held by the battery holding portion of the UAV, the replacement battery holding portion being configured to hold the second battery in a position in the path of travel of the UAV such that, upon the UAV encountering the second battery, the second battery imparts a mechanical impulse to the first battery causing the first battery to be released from the battery holding portion and the second battery replaces the first battery to become held by the battery holding portion of the UAV.

The disclosure may be used in conjunction with a subscription charge system for battery exchange. A fixed charge may be levied for example for a number of exchanges. The controller 903 may verify the authenticity of batteries that are exchanged. If an unauthorised battery is exchanged, penalties may be levied. There may be a fixed subscription charge (standing charge) and a charge per battery exchange. The subscriber may be identified by the UAV which has an electronic or visual identifier or by the battery that is exchanged or both. The electronic identifier may be transmitted wirelessly. The controller 903 at the battery exchange system (for example system 228) may communicate with a subscription server over a computer network (using communication interface 904). The subscription server contains information on each subscription held and controls billing for battery exchanges and can control whether an exchange is permitted or occurs.

Some embodiments of the present disclosure are defined by the following numbered clauses:

1. An unmanned aerial vehicle (UAV) comprising a battery holding portion configured to releasably hold a first battery to provide electrical power to the UAV, the battery holding portion being configured to hold the first battery in a position relative to a direction of travel of the UAV such that, upon the UAV encountering a second battery positioned in the path of travel of the UAV, the first battery receives a mechanical impulse from the second battery causing the first battery to be released from the battery holding portion and the second battery replaces the first battery to become held by the battery holding portion to provide electrical power to the UAV.
2. A UAV according to clause 1, wherein:
    one of the first and second batteries comprises an engaging portion and the other of the first and second batteries comprises a receiving portion corresponding to the engaging portion;
    upon the UAV encountering the second battery positioned in the path of travel of the UAV, the engaging portion and receive portion of the first and second batteries engage in order for the first battery to receive the mechanical impulse from the second battery.
3. A UAV according to clause 2, wherein:
    the engaging portion is a tapered protrusion and the receiving portion is a tapered cavity of corresponding shape to the tapered protrusion;
    upon the UAV encountering the second battery positioned in the path of travel of the UAV, the tapered protrusion and tapered cavity of the first and second batteries engage in order for the first battery to receive the mechanical impulse from the second battery.
4. A UAV according to any preceding clause, wherein first and second batteries are each releasably held by the battery holding portion via a friction fit.
5. A UAV according to any preceding clause, wherein the first and second batteries are each held by the battery holding portion via one or more retractable projections.
6. A UAV according to any preceding clause, wherein the first and second batteries are each held by the battery holding portion via a magnetic fit.
7. A UAV according to any preceding clause, wherein the path of travel of the UAV is horizontal relative to the ground when the first battery receives the mechanical impulse.
8. A UAV according to any one of clauses 1 to 6, wherein the path of travel of the UAV is vertical relative to the ground when the first battery receives the mechanical impulse.
9. A UAV according to any preceding clause, comprising communication circuitry configured to wirelessly transmit a signal to a battery replacement apparatus configured to position the second battery in the path of travel of the UAV, the signal being indicative of a characteristic of the second battery and the second battery being selectable from a plurality of batteries by the battery replacement apparatus using the signal.
10. A battery replacement apparatus for providing replacement of a battery releasably held by a battery holding portion of an unmanned aerial vehicle (UAV) according to clause 1, the apparatus comprising a replacement battery holding portion for releasably holding a second battery for replacing a first battery releasably held by the battery holding portion of the UAV, the replacement battery holding portion being configured to hold the second battery in a position in the path of travel of the UAV such that, upon the UAV encountering the second battery, the second battery imparts a mechanical impulse to the first battery causing the first battery to be released from the battery holding portion and the second battery replaces the first battery to become held by the battery holding portion of the UAV.
11. A battery replacement apparatus according to clause 10, wherein:
    one of the first and second batteries comprises a tapered protrusion and the other of the first and second batteries comprises a tapered cavity of corresponding shape to the tapered protrusion;
    upon the UAV encountering the second battery positioned in the path of travel of the UAV, the tapered protrusion and tapered cavity of the first and second batteries engage in order for the second battery to impart the mechanical impulse to the first battery.
12. A system comprising:
    a battery replacement apparatus according to clause 10 or 11; and
    a charger for charging the second battery prior to the second battery being held by the replacement battery holding portion in the position in the path of travel of the UAV.
13. A system according to clause 12 comprising a transporter configured to receive the first battery released from the battery holding portion of the UAV and to transport the first battery to the charger for charging.

14. A system according to clause 12 or 13, comprising:
communication circuitry configured to wirelessly receive a signal from the UAV, the signal being indicative of a characteristic of the second battery; and
selector circuitry configured to control the selection of the second battery from a plurality of batteries using the signal.

15. A battery for being releasably held by a battery holding portion of an unmanned aerial vehicle (UAV) according to clause 1 to provide electrical power to the UAV, the battery comprising a tapered protrusion at one end and a tapered cavity of corresponding shape to the tapered protrusion at an opposite end, wherein the tapered protrusion or tapered cavity is configured to engage, respectively, with a tapered cavity or tapered protrusion of another battery positioned in the path of travel of the UAV upon the UAV encountering the other battery such that a mechanical impulse is imparted from the other battery to the battery causing the battery to be released from the battery holding portion of the UAV.

16. A system comprising an unmanned aerial vehicle (UAV) according to clause 1 and a battery replacement apparatus according to clause 10.

17. A method of controlling an unmanned aerial vehicle (UAV), wherein the UAV comprises a battery holding portion configured to releasably hold a first battery to provide electrical power to the UAV, the battery holding portion being configured to hold the first battery in a position relative to a direction of travel of the UAV such that, upon the UAV encountering a second battery positioned in the path of travel of the UAV, the first battery receives a mechanical impulse from the second battery causing the first battery to be released from the battery holding portion and the second battery replaces the first battery to become held by the battery holding portion to provide electrical power to the UAV, wherein the method comprises controlling the UAV to travel along the path in which a second battery is positioned so that the UAV encounters the second battery.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. An unmanned aerial vehicle (UAV), comprising:
a battery holding portion having first and second openings at opposite ends and configured to releasably hold a first battery to provide electrical power to the UAV, the battery holding portion being configured to hold the first battery in a position away from a body of the UAV such that, upon the first battery directly impacting, at the first opening, a second battery external to the UAV, the first battery receives a mechanical impulse from the second battery due to relative motion between the UAV and the second battery, causing the first battery to be released from the battery holding portion via the second opening, whereby the second battery replaces the first battery to become held by the battery holding portion to provide electrical power to the UAV.

2. The UAV according to claim 1, wherein:
one of the first and second batteries comprises a tapered protrusion and the other of the first and second batteries comprises a tapered cavity of corresponding shape to the tapered protrusion; and
upon the UAV impacting the second battery, the tapered protrusion and tapered cavity of the first and second batteries engage in order for the first battery to receive the mechanical impulse from the second battery.

3. The UAV according to claim 1, wherein the first and second batteries are each releasably held by the battery holding portion via a friction fit.

4. The UAV according to claim 1, wherein the first and second batteries are each held by the battery holding portion via one or more retractable projections.

5. The UAV according to claim 1, wherein the first and second batteries are each held by the battery holding portion via a magnetic fit.

6. UAV according to claim 1, wherein the UAV is travelling in a horizontal direction relative to the ground when the first battery receives the mechanical impulse.

7. The UAV according to claim 1, wherein the UAV is travelling in a vertical direction relative to the ground when the first battery receives the mechanical impulse.

8. The UAV according to claim 7, wherein the mechanical impulse causes the first battery to be ejected via the second opening, which is located closer to the body of the UAV than the first opening.

9. The UAV according to claim 1, further comprising communication circuitry configured to wirelessly transmit a signal to a battery replacement apparatus configured to position the second battery, the signal being indicative of a characteristic of the second battery and the second battery being selectable from a plurality of batteries by the battery replacement apparatus using the signal.

10. A battery replacement apparatus for providing replacement of a battery releasably held by the battery holding portion of the unmanned aerial vehicle (UAV) according to claim 1, the apparatus comprising:
- a replacement battery holding portion for releasably holding the second battery for replacing the first battery releasably held by the battery holding portion of the UAV, the replacement battery holding portion being configured to hold the second battery such that, upon the UAV impacting the second battery, the second battery imparts the mechanical impulse to the first battery causing the first battery to be released from the battery holding portion, whereby the second battery replaces the first battery to become held by the battery holding portion of the UAV.

11. The battery replacement apparatus according to claim 10, wherein:
- one of the first and second batteries comprises a tapered protrusion and the other of the first and second batteries comprises a tapered cavity of corresponding shape to the tapered protrusion; and
- upon the UAV impacting the second battery, the tapered protrusion and tapered cavity of the first and second batteries engage in order for the second battery to impart the mechanical impulse to the first battery.

12. A system, comprising:
- the battery replacement apparatus according to claim 10; and
- a charger configured to charge the second battery prior to the second battery being held by the replacement battery holding portion.

13. The system according to claim 12, further comprising a transporter configured to receive the first battery released from the battery holding portion of the UAV and to transport the first battery to the charger for charging.

14. The system according to claim 12, further comprising:
- communication circuitry configured to wirelessly receive a signal from the UAV, the signal being indicative of a characteristic of the second battery; and
- selector circuitry configured to control selection of the second battery from a plurality of batteries using the signal.

15. A battery releasably held by the battery holding portion of the unmanned aerial vehicle (UAV) according to claim 1 to provide electrical power to the UAV, the battery comprising a tapered protrusion at one end and a tapered cavity of corresponding shape to the tapered protrusion at an opposite end, wherein the tapered protrusion or tapered cavity is configured to engage, respectively, with a tapered cavity or tapered protrusion of another battery positioned external to the UAV upon the UAV encountering the other battery such that the mechanical impulse is imparted from the other battery to the battery causing the battery to be released from the battery holding portion of the UAV.

16. A system, comprising:
- the unmanned aerial vehicle (UAV) according to claim 1; and
- a battery replacement apparatus comprising a replacement battery holding portion for releasably holding the second battery for replacing the first battery releasably held by the battery holding portion of the UAV, the replacement battery holding portion being configured to hold the second battery such that, upon the UAV impacting the second battery, the second battery imparts the mechanical impulse to the first battery causing the first battery to be released from the battery holding portion, whereby the second battery replaces the first battery to become held by the battery holding portion of the UAV.

17. An unmanned aerial vehicle (UAV), comprising:
- a battery holding portion configured to releasably hold a first battery to provide electrical power to the UAV, the battery holding portion being configured to hold the first battery in a position away from a body of the UAV such that, upon the UAV encountering a second battery positioned external to the UAV, the first battery receives a mechanical impulse from the second battery, causing the first battery to be released from the battery holding portion, whereby the second battery replaces the first battery to become held by the battery holding portion to provide electrical power to the UAV,
wherein one of the first and second batteries comprises a tapered protrusion and the other of the first and second batteries comprises a tapered cavity of corresponding shape to the tapered protrusion.

* * * * *